United States Patent [19]

Solomon et al.

[11] Patent Number: 5,625,779
[45] Date of Patent: Apr. 29, 1997

[54] ARBITRATION SIGNALING MECHANISM TO PREVENT DEADLOCK GUARANTEE ACCESS LATENCY, AND GUARANTEE ACQUISITION LATENCY FOR AN EXPANSION BRIDGE

[75] Inventors: Gary A. Solomon, Hillsboro; Peter D. MacWilliams, Aloha, both of Oreg.; George R. Hayek; Nicholas D. Wade, both of Cameron Park, Calif.; Abid Asghar, Sacramento, Calif.

[73] Assignee: Intel Corporation, Santa Clara, Calif.

[21] Appl. No.: 366,964

[22] Filed: Dec. 30, 1994

[51] Int. Cl.⁶ .................................................. G06F 13/36
[52] U.S. Cl. ...................... 395/293; 395/200.05; 395/856
[58] Field of Search ...................................... 395/293, 856, 395/200.05, 306

[56] References Cited

U.S. PATENT DOCUMENTS

| | | | |
|---|---|---|---|
| 5,257,356 | 10/1993 | Brockmann et al. | 395/725 |
| 5,265,211 | 11/1993 | Amini et al. | 395/856 |
| 5,392,407 | 2/1995 | Heil et al. | 395/293 |
| 5,416,910 | 5/1995 | Moyer et al. | 395/325 |
| 5,467,295 | 11/1995 | Young et al. | 395/200.05 |
| 5,469,435 | 11/1995 | Krein et al. | 370/85.2 |
| 5,519,838 | 5/1996 | Ziegler et al. | 395/299 |

*Primary Examiner*—Jack B. Harvey
*Assistant Examiner*—Paul R. Myers
*Attorney, Agent, or Firm*—Blakely, Sokoloff, Taylor & Zafman

[57] ABSTRACT

An arbitration signaling mechanism for an intermediate bus coupled between an expansion bridge and a host bridge that manages communication over the intermediate bus. The host bridge includes a CPU posting buffer for posting transactions between a CPU and the expansion bridge, and a DRAM buffer for storing data to be written into the DRAM. The host bridge also includes an arbiter coupled to receive a request signal from the expansion bridge and any other bus agents coupled to the expansion bridge. Responsive to a request from the expansion bridge, the arbiter empties the CPU posting buffer and the DRAM buffer before asserting an acknowledge signal. A passive release method is provided, which includes signaling a passive release semantic by the expansion bridge during a communication cycle in which the expansion bridge has bus control. The host bridge can grant temporary use of the bus to another bus agent before again granting access to the expansion bridge.

8 Claims, 4 Drawing Sheets

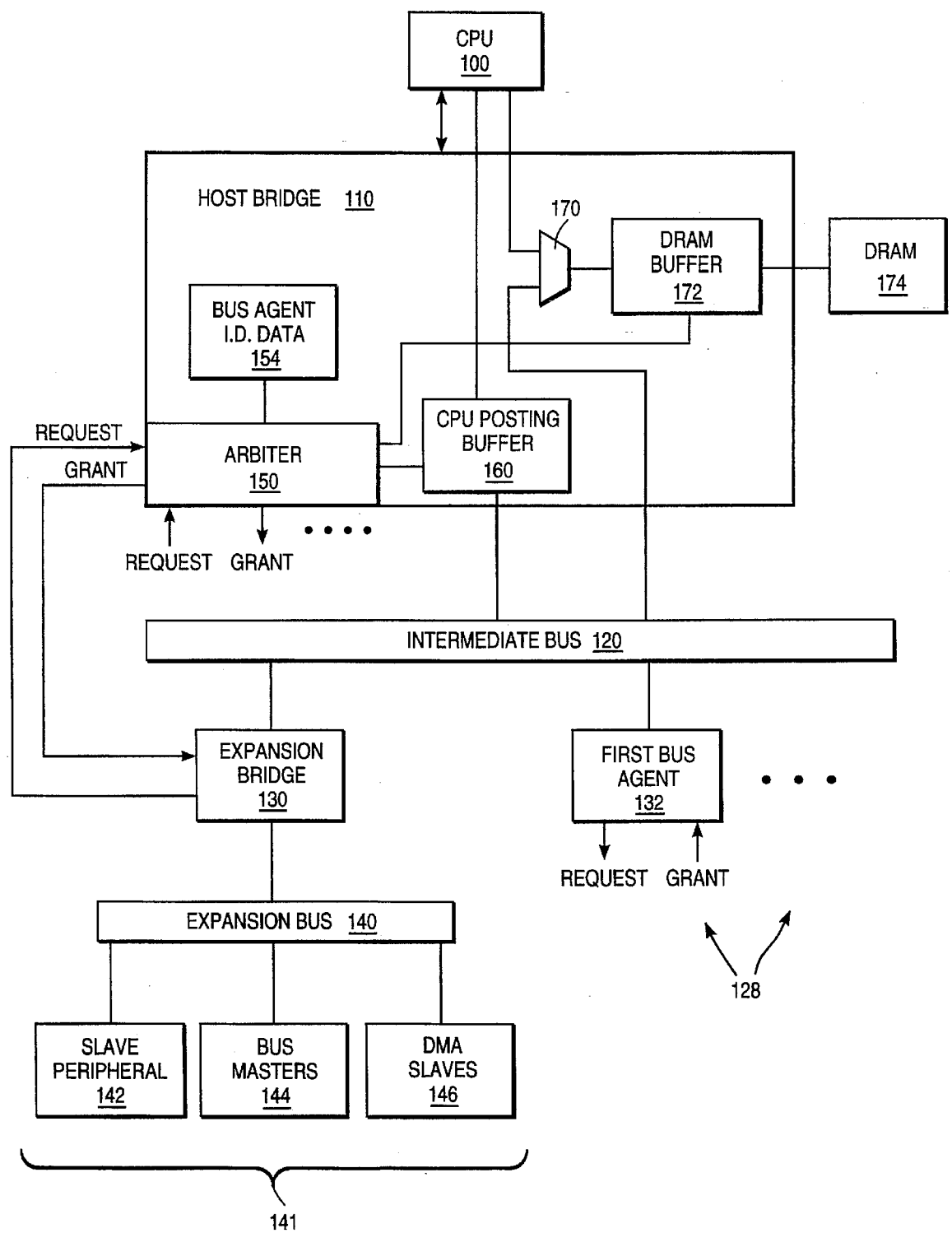
FIG_1

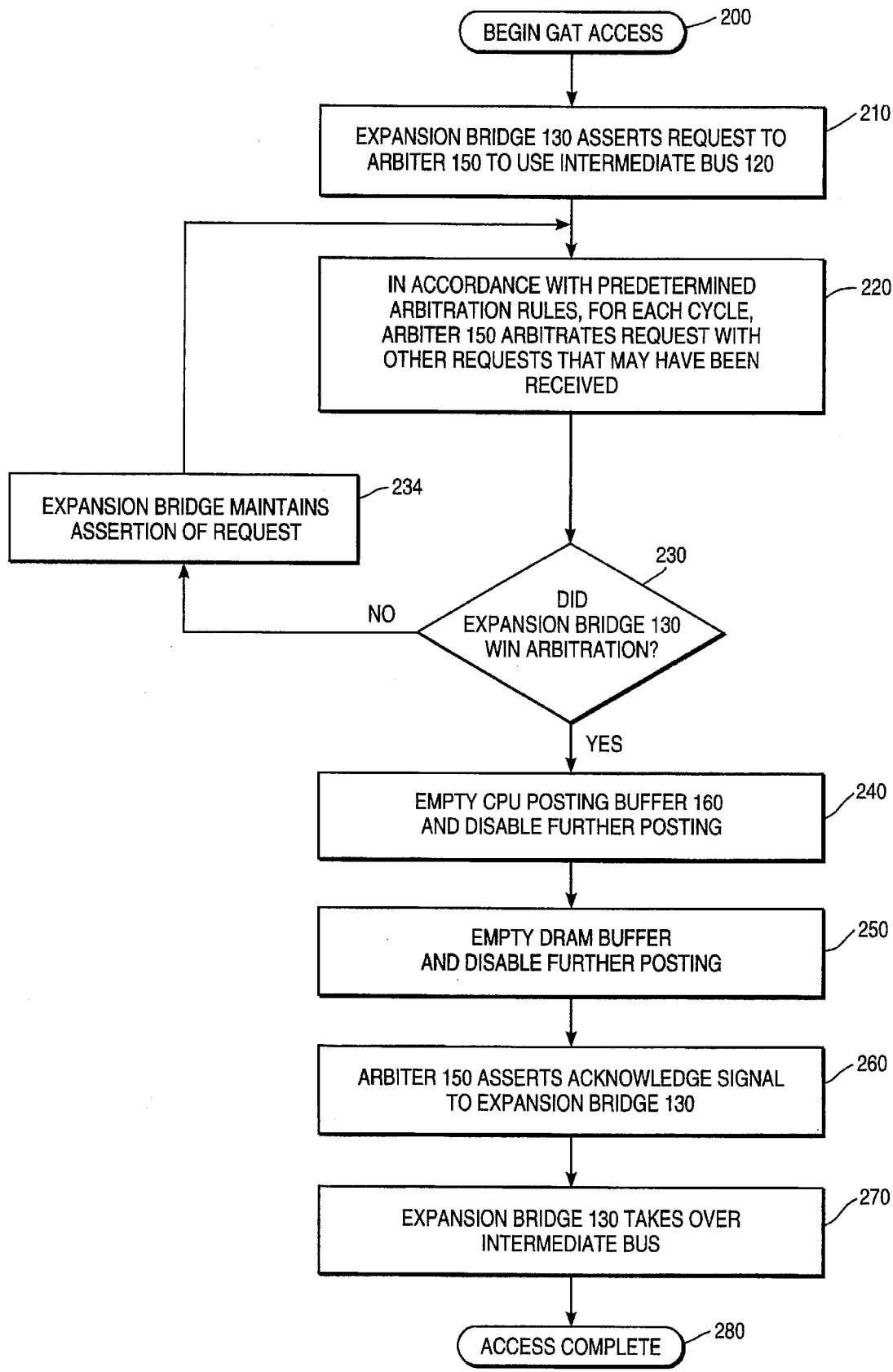
FIG_2

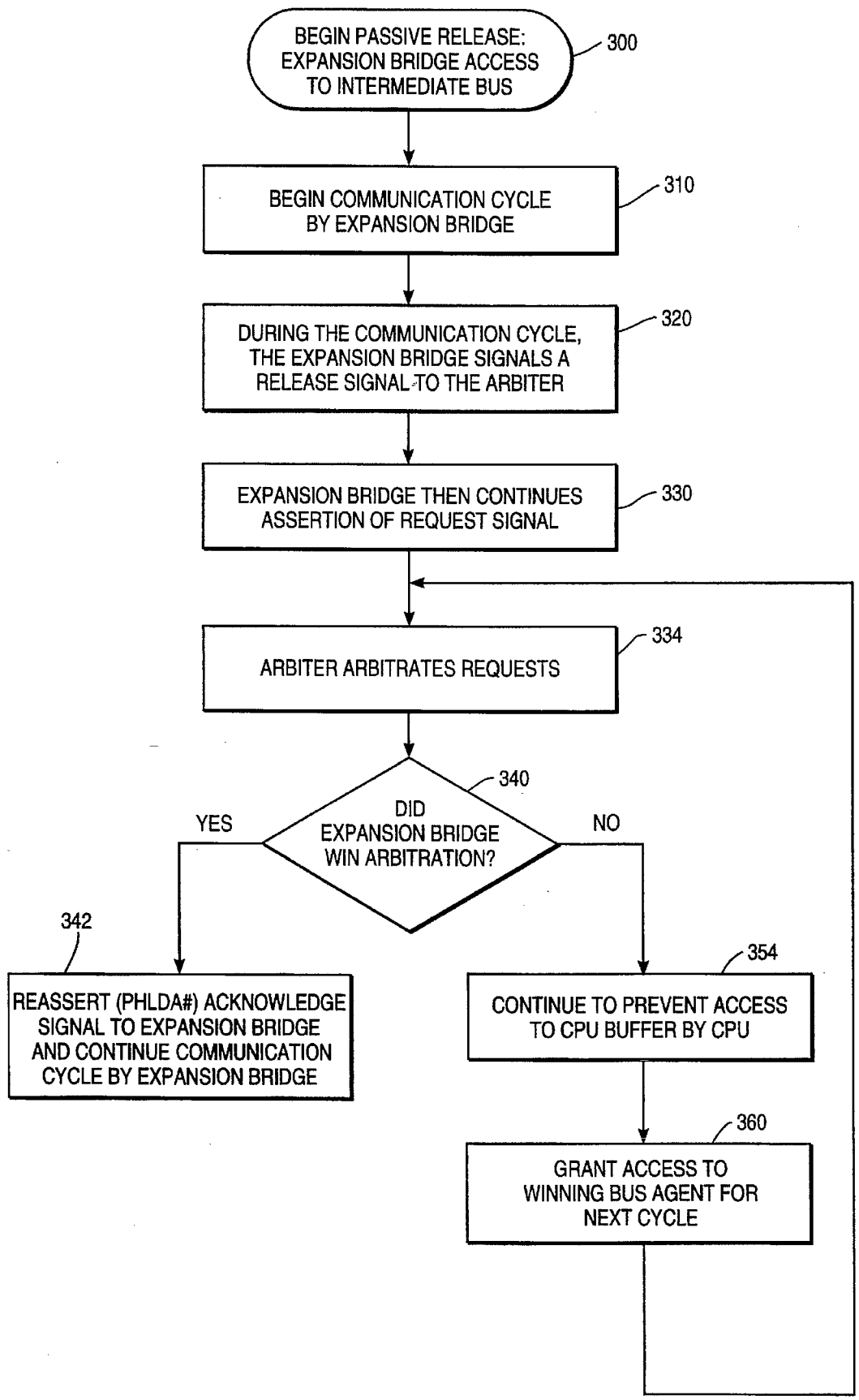
FIG_3

NO PASSIVE RELEASE
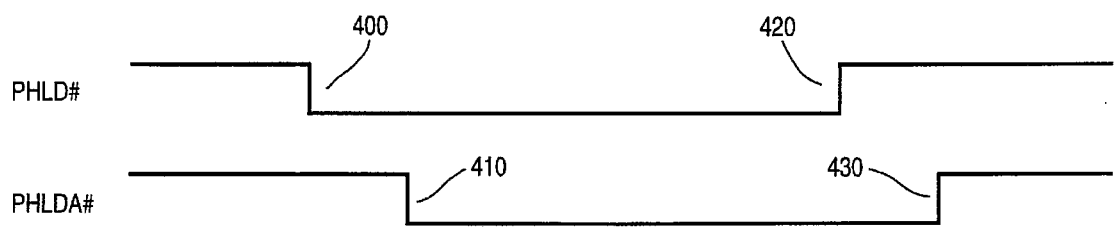
FIG_4
PASSIVE RELEASE ENABLED
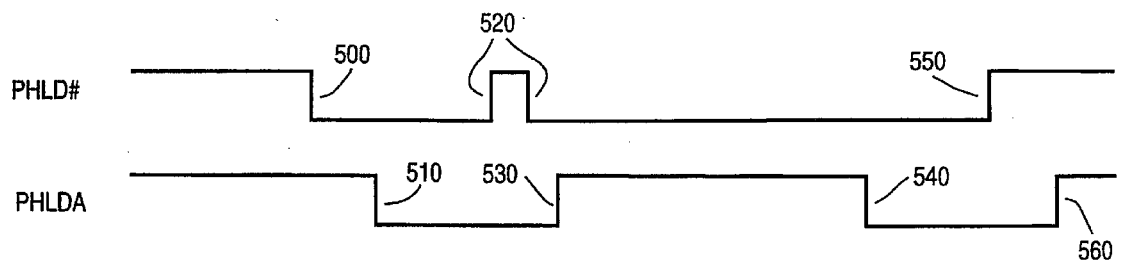
FIG_5

ARBITRATION SIGNALING MECHANISM TO PREVENT DEADLOCK GUARANTEE ACCESS LATENCY, AND GUARANTEE ACQUISITION LATENCY FOR AN EXPANSION BRIDGE

BACKGROUND OF THE INVENTION

1. Field of the Invention

The present invention relates to bus communication systems that use an intermediate bus in a computer system that has an expansion bridge and a host bridge connected to the intermediate bus.

2. Description of Related Art

In most computer systems, a central processing unit ("CPU") is the center of processing activity. In order to communicate with peripheral devices, such as printers, the CPU utilizes a communication system that typically includes a bus to which a plurality of devices are connected. This bus may be termed the "intermediate" bus. In one configuration, the CPU is connected to a host bridge, which manages communication between the CPU and the intermediate bus.

In addition to single devices coupled to the intermediate bus, additional buses can be coupled to the intermediate bus. In order to accomplish this, one or more expansion bridges are coupled to the intermediate bus which manage communication between the intermediate bus and the expansion bus. Any of a number of different peripherals and types of peripherals can be connected to the expansion bus. For example, slave peripherals, DMA slaves, and bus masters could be coupled to the expansion bus to communicate through the expansion bridge to the host bridge and the CPU and other circuitry, such as Random Access Memory that may be coupled to the host bridge.

Industry-wide standards have been set up to standardize the interface between the expansion bridge and the host bridge. One industry standard is that an expansion bus cannot be preempted once access is granted, according to industry standard expansion bus rules such as the Industry Standard Architecture ("ISA") rules. In other words, an expansion bridge must always be allowed to complete its cycle subsequent to its access. A second industry standard is that, for coherency reasons, read cycles originating from the expansion bridge cannot pass data posted in the CPU buffer, which is positioned between the CPU and the intermediate bus. In other words, any read cycles from the intermediate bus cannot pass data posted within the host bridge and therefore cannot accept the cycle until the CPU buffer in the host bridge is empty.

During operation, it is possible that some systems adhering to these constraints can lock up and become nonfunctional. A deadlock can occur if a CPU cycle that targets the expansion bus is posted in the CPU buffer at the same time that an expansion bridge cycle has started up. For example, if the CPU cycle that targets the expansion bridge posts to the CPU buffer, and an expansion bus master is granted bus access, the expansion master's attempt to read DRAM will not be successful (i.e., will not be allowed to complete) because the CPU buffer is not empty. At the same time, the expansion bridge will not give up control of the bus to receive the information posted in the CPU buffer until its operations have completed. Because the expansion bridge cannot complete and will not give up, the result is deadlock.

Prior chip sets that support bus concurrency between a CPU and intermediate bus require special sideband signals to prevent deadlock and provide a guaranteed response time to expansion bridge traffic, particularly that targeting DRAM. The term "Guaranteed Access Timing" ("GAT") is used to describe systems having this guaranteed response time and a deadlock prevention mechanism. Systems implementing GAT have previously implemented a special sideband coupling that provides three additional buffer management sideband signals in order to provide GAT operation.

In order to address the deadlock problem in previous systems, expansion bridges have used the special sideband coupling to assert a flush request signal ("FLSHREQ") that commands the host bridge to empty the CPU buffer and to disable further posting while it remains asserted. This special sideband coupling increases hardware cost, and it would be an advantage to eliminate it while still maintaining its functionality.

Another problem relates to the access completion latency of any transaction over the expansion bridge. Industry-wide standards, although varying in the exact amount of time, generally require a maximum time during which the bus cycle can be stalled or held in wait states awaiting data availability. This time may be referred to as an access completion latency time. For example, according to ISA "AT" compatibility standards, the maximum access completion latency time via the "IOCHRDY" signal must be less than 2.5 µs.

Achieving this specification can be difficult in some circumstances. For example, this specification may be violated if the cycle targets DRAM and the DRAM buffer has data stored in it when the bus request is granted. Due to the additional time necessary to flush the DRAM buffer, a latency violation could occur.

In order to ensure that the access completion latency period is within the maximum requirement, previous systems have used the special purpose sideband coupling to assert a memory request ("MEMREQ") signal to empty the DRAM buffer, and maintain it in its flushed condition by disabling further posting while it remains asserted. To properly use this signal, the expansion bridge is required to assert the MEMREQ signal to empty the DRAM buffer before starting any communication cycle. The special sideband coupling increases hardware cost, and it would be advantageous to eliminate it.

Another problem (the "bus acquisition" problem) created by the expansion bridge is the possibility of bus back-up. Once the expansion bridge has granted access to a non-preemptible bus agent, the bus grant is locked until the expansion bridge decides to release the bus. In other words, the arbiter cannot take the bus away. The problem is that some expansion bridge devices have very low bandwidth and can hold the intermediate bus for lengthy periods of time. During these periods, all other agents on the intermediate bus are prevented from using it. As a result, these other agents may have a very long bus acquisition latency before they are granted the bus.

In addition to providing a guaranteed access latency, it would be an advantage to provide a system that guarantees bounded, quantifiable intermediate bus acquisition latency in systems with expansion bus bridges.

SUMMARY OF THE INVENTION

The present invention provides a bridge apparatus for managing communication between the CPU and at least one expansion bridge. An intermediate bus is coupled between an expansion bridge and a host bridge. A host bridge is also coupled to a CPU and a DRAM. The host bridge includes a CPU posting buffer for posting transactions between the CPU and the intermediate bus, a DRAM buffer for storing data to be written into the DRAM, and an arbiter coupled to receive a request signal from the expansion bridge. Responsive thereto, the arbiter empties the CPU posting buffer and the DRAM buffer, and then asserts a grant signal. The expansion bridge includes circuitry responsive to the grant signal for communicating with the host bridge over the intermediate bus.

The guaranteed access method (GAT) utilizing the above apparatus includes the steps of asserting the request by the expansion bridge to the arbiter. Responsive thereto, the arbiter arbitrates other requests together with any other requests asserted by any other agents connected to the intermediate bus. After the expansion bridge wins arbitration in the arbiter, but before the arbiter grants access, the CPU posting buffer and DRAM buffer are emptied. After both buffers are emptied and disabled, a grant signal is asserted to the expansion bridge to allow its use of the intermediate bus.

A passive release method utilizing the above apparatus and method is provided, which includes the step of signaling a passive release signal by the expansion bridge during a communication cycle in which the expansion bridge has control of the intermediate bus. Responsive to the passive release signal, the host bridge removes the grant to the expansion bridge, performs arbitration of all currently pending requests, and grants access accordingly.

Two pins are utilized to perform all functions including arbitration and flushing. Utilizing these two signals, the system prevents deadlock, guarantees response time for GAT devices, and can also guarantee bounded acquisition time for other agents. This two-pin interface replaces the three-pin interface of previous systems, thereby eliminating the need for one pin.

The passive release scheme described herein can enhance system performance by bounding the worst case intermediate bus acquisition latency for other intermediate bus agents during nonpreemptible expansion bridge cycles to DRAM, such as may be provided by cycles from DMA or expansion bus masters. As a result, the system can provide lower overall system latencies, which translates to lower-cost input output (I/O) devices and improved system responsiveness. One use of such a system is for PCI-based multimedia video-capture cards.

BRIEF DESCRIPTION OF THE DRAWINGS

FIG. 1 is a block diagram of the system including a CPU, a host bridge, an intermediate bus, an expansion bridge and an expansion bus coupled to the expansion bridge.

FIG. 2 is a flow chart illustrating guaranteed access timing (GAT) for a communication cycle request by the expansion bridge.

FIG. 3 is a flow chart illustrating passive release operations by which the expansion bridge can temporarily relinquish control of the intermediate bus to other bus agents on the intermediate bus.

FIG. 4 is a timing diagram illustrating, for an expansion bridge, a system that does not implement a passive release system or in which passive release is disabled.

FIG. 5 is a flow chart illustrating a system in which passive release is enabled.

DETAILED DESCRIPTION OF THE PREFERRED EMBODIMENT

The drawings disclose various embodiments of the present invention for purposes of illustration. One skilled in the art will recognize alternative embodiments that may be employed without departing from the principles of the invention.

Reference is first made to FIG. 1, which is a block diagram of one implementation of the present invention. A CPU 100 is provided to process signals, perform computations, control activities, and any other function performable by CPUs. Any conventional CPU could be utilized. The CPU 100 is coupled to a host bridge 110, which provides an interface between the CPU 100 and an intermediate bus 120. The intermediate bus 120 is coupled to a plurality of bus agents 128, including an expansion bridge 130 and a first bus agent 132. In one embodiment, the intermediate bus 120 comprises a bus constructed according to PCI (Peripheral Component Interconnect) standards, and all agents on the bus comply with the PCI standard.

In general terms, the intermediate bus 120 is utilized to physically exchange data between the host bridge 110 and all agents connected to it. The bus agents 128 could include input output (I/O) devices, PCI bridges, or an expansion bridge. Examples of bus agents 128 include other PCI bridge devices, SCSI controllers, graphics controllers, PCMCIA interface devices, and keyboard controllers. Each bus agent 128 competes for bus access at a centralized arbiter within the host bridge 100 to be described. When a particular bus agent determines that it wants to use the bus, a request is signaled from the bus agent to the arbiter. After arbitration, the winning bus agent receives a grant signal from the arbiter to acknowledge bus access.

The expansion bridge 130 is coupled to an expansion bus 140, which operates to exchange data and other signals between the expansion bridge 130 and one or more peripherals connected thereto. For example, ISA slave peripherals 142, ISA bus masters 144, and ISA DMA slaves 146 may be coupled to the expansion bus 140. In general terms, the expansion bridge 130 manages communication between the intermediate bus 120, the expansion bus 140, and all of the peripherals 141 attached to the expansion bus 140. The expansion circuitry including the bridge 130, the bus 140, and the peripherals 142–146 preferably operate according to industry-wide standards such as ISA or EISA (Enhanced ISA).

The host bridge 110 manages communication between the CPU 100, the intermediate bus 120, and all bus agents 128 connected thereto. To arbitrate between the various devices that request bus access, the host bridge 110 includes an arbiter 150 that includes circuitry to receive a request signal from the expansion bridge 130 and from any other agent 128 connected the intermediate bus 120, and to generate a grant signal. The arbiter 150 implements a centralized arbitration system. Particularly, the arbiter 150 samples request signals from bus agents 128 during a first (current) communication cycle, performs arbitration for a next communication cycle, and then grants bus access to the winning agent 128.

The arbiter 150 has identification data 154 available to it that identifies each bus agent. Particularly, the identification information 154 includes information that distinguishes the expansion bridge 130 from other bus agents such as the first bus agent 132.

The host bridge 110 includes a CPU posting buffer 160 coupled to the CPU 100 to buffer data for transfers from the CPU 100 through the intermediate bus 120 to any bus agents 128 such as the expansion bridge 130. If the expansion bridge is targeted, the posted data could eventually be intended for the peripheral devices 142–146 coupled to the expansion bus 140.

The CPU 100 is also coupled to a first input of a multiplexer 170 whose output is connected to a DRAM buffer 172. A second input of the multiplexer 170 is coupled to the intermediate bus 120. The DRAM buffer 172 buffers data for writes to a DRAM ("Dynamic Random Access Memory") 174. Although, in the implemented embodiment, the memory is specified as DRAM, other types of quick access memory could be utilized.

The arbiter 150 is coupled to the DRAM buffer 172 and the CPU posting buffer 160. Under some circumstances, following arbitration, the arbiter 150 signals the DRAM buffer 172 to empty its contents into the DRAM 174. Furthermore, the arbiter 150 can also signal the CPU posting buffer 160 to empty its contents, via the intermediate bus 120, to its intended destination.

In summary, the host bridge 110 includes an arbiter 150, the CPU posting buffer 160, bus agent identification data 154, a DRAM buffer 172, and any control logic necessary to perform its functions.

Description of the Guaranteed Access Timing System (FIG. 2)

In order to prevent deadlock in an efficient and inexpensive manner, the implemented embodiment utilizes two arbitration signals, including a request signal (sometimes termed a "PHLD#" signal) and a grant signal (sometimes termed an acknowledge or "PHLDA#" signal) to guarantee access in accordance with the described flow chart.

Reference is now made to FIG. 2, which illustrates an access method for GAT (Guaranteed Access Timing). Access operations begin in a box 200. Next, at 210, the expansion bridge 130 asserts a request to the arbiter 150 to use the intermediate bus 120. Next, operation moves to the box 220. The request from the expansion bridge is arbitrated by the arbiter 150 in accordance with predetermined arbitration rules for each cycle, such as fair rotating priority. Particularly, any other requests from any other bus agents 128 that may have been received by the arbiter are also arbitrated. In the decision 230, if the expansion bridge 130 did not win the arbitration, then operation moves to a box 234 which indicates that the expansion bridge 130 maintains assertion of its request. Typically, at this point, the other higher priority bus agent will take control of the bus for the next communication cycle. Then operation returns to the box 220 in which, for the next cycle, the arbiter 150 again arbitrates all requests.

After the expansion bridge 130 wins the arbitration, then operation moves from the decision 230 into the box 240 in which the CPU posting buffer 160 within the host bridge 110 is emptied. For example, if the CPU 100 has applied data to the CPU posting buffer, this data is supplied to the intermediate bus and delivered and forwarded by the expansion bridge to its final destination.

As illustrated in a box 250, a DRAM buffer 172 is emptied into DRAM 174. Emptying the buffers in the boxes 240 and 250 can occur in any convenient order, and does not necessarily occur in the order shown. These operations could occur substantially simultaneously.

After emptying both buffers is complete, operation moves to the box 260 in which the arbiter 150 asserts an acknowledge signal to the expansion bridge 130, which signals that the expansion bridge 130 now has control of the intermediate bus. In accordance with GAT mode protocol standards, the arbiter 150 cannot deassert the acknowledge signal until the expansion bridge 130 drops its request.

After receipt of the acknowledge signal, the expansion bridge 130 takes over the intermediate bus 120 for as long as it keeps its request active, as illustrated in a box 270. At this point, access is complete as illustrated at 280.

The step 240, in which the CPU posting buffer 160 is emptied and kept from posting during the communication cycle, prevents the deadlock condition that could otherwise occur if the CPU has posted a cycle within the CPU posting buffer targeting the expansion bus and shortly thereafter, the expansion bridge 130 is granted access. Under such circumstances, as described in the background section, deadlock could occur because the CPU posting buffer cannot empty its data to the expansion bus while the expansion bridge has access, and the expansion bridge will not give up access until its communication cycle is complete. The method described herein, wherein the CPU posting buffer 160 is emptied before asserting the acknowledge signal, prevents occurrence of a deadlock condition.

The step 250, in which the DRAM buffer is emptied, is useful to prevent violation of a maximum access latency specification for standard expansion bridges. Access latency is defined as the delay from the time a bus cycle begins until the data has been accepted at its end point. In the worst case scenario, it is possible that this maximum access latency specification can be exceeded if the DRAM write buffer has data in it when the request is granted, that would then be emptied first. To prevent this, the DRAM buffer is flushed before the cycle begins, which avoids an access latency violation due to the added time while waiting for the DRAM buffer to empty.

In one implementation, the request signal from the expansion bridge 140 is termed the PHLD# signal and the acknowledge signal from the arbiter to the expansion bus is called PHLDA#. When the arbiter 150 receives a PHLD# request, it identifies the request as originating at an expansion bridge, utilizing the bus agent ID data 154 to accomplish the identification. Subsequently, the CPU posting buffer 160 and the DRAM buffer 172 are flushed and disabled to avoid the deadlock and latency problems and to therefore ensure GAT mode operation.

The PHLD# and PHLDA# signals are special signals exchanged between the expansion bridge and the host bridge. Other bus agents on the intermediate bus may be preemptible and therefore they may not need this maximum latency specification requirement. In the absence of the two requirements other arbitration methods or other priorities could be utilized. For these agents, it may not be necessary to flush the DRAM buffer and the CPU buffer. The arbiter 150, responsive to ID data 154 can determined whether or not to flush either of these buffers before granting a bus request.

Discussion of Previous Implementations

In previous implementations, additional sideband signals were needed because an arbiter was positioned within the expansion bridge rather than in the host bridge. As a result, additional signals generated by the arbiter in the expansion bridge were passed from the expansion bridge to the buffers within the host bridge in order to accomplish the emptying operation and to maintain emptied buffers. Furthermore, a signal was provided from the host bridge to the expansion bridge that acknowledges completion of both buffers being empty.

When the arbiter is positioned in the expansion bridge, as in previous implementations, the host bridge can request the bus at any time and two pins are not sufficient to convey the sideband information needed beyond the normal request-grant protocol. In other words, with the arbiter positioned in the expansion bridge, the request-grant signals are not available to communicate additional information about expansion bridge requests, and therefore cannot directly affect the host bridge. So therefore the sideband signals were needed.

With the arbiter positioned in the host bridge, the PHLD# and PHLDA# signals can be defined such that the flushing (and subsequent grant following arbitration) can be accomplished efficiently and cost-effectively. The time from flushing the buffers to issuing the grant to the expansion bus is also reduced because the arbiter directly issues the grant in one clock as opposed to the previous side band protocol in which the host bridge would first indicate that the buffers are flushed and then in the next clock cycle the expansion bridge would issue itself a grant.

Description of the Passive Release Mechanism (FIGS. 3–5)

In some systems, a relatively slow device coupled to the expansion bridge can substantially increase the overall acquisition latencies of the other bus agents attached to the intermediate bus. In such a circumstance, the following passive release mechanism can be useful to reduce the acquisition latency times for other agents on the intermediate bus.

The passive release system allows the expansion bridge 130, under certain circumstances that it determines appropriate, to allow itself to be preempted from the intermediate bus even if the expansion bus access has not yet completed. When the expansion bridge determines that it can passively release the intermediate bus (i.e., relinquish bus control), it asserts a signal (a passive release semantic) to the arbiter 150, and then reasserts its request on PHLD#. Upon recognition of the expansion bridge's willingness to relinquish control, the arbiter then deasserts PHLDA# (the expansion bridge's grant) and rearbitrates all currently pending requests from the bus agents, including the request of the expansion bus. In the subsequent arbitration, the arbiter may grant access to another bus agent, or it may again grant access to the expansion bridge.

Reference is now made to FIG. 3, which is a flow chart that illustrates the passive release method. Beginning at a box 300, the passive release method first assumes that the expansion bridge 130 has obtained access to the intermediate bus 120 in a manner such as described previously with FIG. 2. Next, at 310, a communication cycle is begun by the expansion bridge 130. At 320, during this communication cycle, the expansion bridge signals a passive release semantic on the PHLD# request signal to the arbiter 150. Then as illustrated at 330, the expansion bridge continues to assert (i.e., re-asserts) its request signal. In the implemented embodiment, the request signal is re-asserted within two intermediate bus clocks.

As illustrated at 334, the arbiter, upon receipt of the PHLD# request signal and other request signals from any other agents, arbitrates the request in any conventional manner such as fair rotating priority. At 340, if the expansion bridge won the arbitration, then its grant (via the acknowledge signal PHLDA#) will be reissued and the expansion bridge is allowed to continue its communication in the next cycle. At some point the expansion bridge may again determine to assert that the passive release semantic, and the above method would then be repeated. The communication by the expansion bridge will eventually be completed, an event which is signaled by an active release from the expansion bridge (deasserting the PHLD# request signal for a longer period than the passive release semantic).

From 340, if the expansion bridge does not win arbitration, then, at 354, the system prevents the CPU from accessing the CPU buffer, and at 360, the intermediate bus is granted to the winning (different) bus agent for the next cycle. Subsequently, operation returns to arbitrate all pending requests in the box 334. Eventually the expansion bridge 140 will again win arbitration and be allowed to continue its communication cycle.

To implement the present invention, the arbiter 150 in the host bridge provides centralized control of the bus. As a result of the centralized control, and its proximity to the buffers, the mechanism to flush the buffers can be implemented at low cost with improved arbiter efficiency. In other words, the three signals of previous implementations are collapsed to just two signals, while maintaining the basic protocol requirements of industry standards such as ISA.

To avoid deadlock during the entire period of passive release, (until the communication from the expansion bridge is complete), the CPU posting buffer 160 is prevented from posting cycles, as illustrated at 354. In other words, when passive release preempts the expansion bridge from the intermediate bus, the arbiter can grant access to other bus agents and the CPU, but cannot allow the CPU to post any data in the CPU buffer until an active release is received by the arbiter. In a simplified implementation, the CPU might be prevented from entirely accessing the intermediate bus. However, it is necessary only that cycles targeting the expansion bridge cannot be run by the CPU or other intermediate bus agents until an active release is received by the arbiter.

In order to enable the passive release mode, the expansion bridge 130 includes a configuration mode option. Normally this option would be configured in the expansion bridge at boot time. Preferably, the expansion bridge includes logic to poll each of the peripherals and cards connected to its bus, to determine which are present and if they can all acceptably violate this longer latency requirement. If so, then this passive release mode of operation can be enabled. Otherwise, the passive release mode would be disabled to prevent interruption of the expansion bridge during the expansion bus communication cycles.

Discussion of Timing Diagrams for the Preferred Embodiment of Passive Release

Reference is now made to FIGS. 4 and 5. FIG. 4 is a timing diagram that illustrates the relationship between PHLD# and PHLDA# signals without passive release, and FIG. 5 illustrates operation of PHLD# and PHLDA# if passive release is enabled. The # designation following each signal indicates that the signal is active low. In other words, the signal is asserted by a low transition.

In FIG. 4, a first low transition 400 causes the PHLD# signal to be asserted to the arbiter 150 to request access of the intermediate bus 120. At some later point in time, a low transition 410 of the PHLDA# signal signifies that the expansion bridge 130 can use the intermediate bus. Subsequently, a low-to-high transition 420 of the PHLD# signal signifies that it is giving up its request to utilize the intermediate bus, which implies that its communication cycle is complete. Subsequently, a low-to-high transition 430 of the PHLDA# signal signifies that the expansion bus no longer can use the bus.

In FIG. 5, a first high-to-low transition 500 of the PHLD# signal signifies a request to the arbiter 150. Subsequently, a high-to-low transition 510 of the PHLDA# signal grants access to the expansion bridge. Subsequently, a short de-assertion of the PHLD# signal at 520 for a short time period, such as one clock cycle, signals to the arbiter 150 that the expansion bridge 130 is performing a passive release. This deassertion at 520 is the "passive release semantic" on the PHLD# signal. In this example, the arbiter accepts the passive release as illustrated by a low-to-high transition 530 of the PHLDA# signal. Subsequently the arbiter grants access to another bus agent. However, because the PHLD# signal is once again asserted by the time 530, it can be granted bus access again. Therefore, the expansion bridge 130 waits until the arbiter again grants access, as illustrated at the transition 540, which is a high-to-low transition of the PHLDA# signal. The communication cycle from the expansion bridge completes and it signals an active release 550 signified by holding PHLD# high for a minimum of two consecutive clock cycles to distinguish it from the passive release semantic. The arbiter then deasserts the PHLDA# signal to signify that the expansion bus is no longer entitled to bus access at transition 560. The arbiter then arbitrates between existing requests for intermediate bus access. The passive release semantic allows multiple use of a single pin that signifies both passive release and a request, thereby reducing cost.

From the above description, it will be apparent that the invention disclosed herein provides a novel and advantageous arbitration signaling mechanism. As will be understood by those familiar with the art, the invention may be embodied in other specific forms without departing from its spirit or essential characteristics. The following claims are indicative of the scope of the invention, and all variations which come within the meaning and range of equivalency of the claims are to be embraced within their scope.

What is claimed is:

1. A passive release method for an expansion bridge and a host bridge coupled to an intermediate bus, said host bridge including an arbiter, a CPU posting buffer, and a DRAM buffer, said passive release method comprising the steps of:

said expansion bridge asserting an intermediate bus request to said arbiter;

said arbiter arbitrating said intermediate bus request;

said expansion bridge winning said arbitration; emptying said CPU posting buffer after said expansion bridge has won arbitration;

after emptying said CPU posting buffer, asserting a grant signal to said expansion bridge to allow said expansion bridge use of said intermediate bus for a transaction;

said expansion bridge determining whether it can relinquish control of said intermediate bus before said transaction is complete;

said expansion bridge signaling a release signal to relinquish control of said intermediate bus before said transaction is complete;

said expansion bridge then immediately re-asserting said intermediate bus request to said arbiter; and said arbiter granting control of said expansion bridge to an agent coupled to said intermediate bus if said agent has higher priority than said expansion bridge, otherwise said arbiter returning control of said intermediate bridge to said expansion bridge, allowing said expansion bridge to continue with said transaction.

2. The passive release method of claim 1, further comprising the step of:

emptying said DRAM buffer after said expansion bridge has won arbitration but before asserting said grant signal to said expansion bridge to allow said expansion bridge use of said intermediate bus.

3. The passive release method of claim 1, further comprising the step of said arbiter maintaining said intermediate bus request by said expansion bridge to use said intermediate bus after said expansion bridge relinquishes control of said intermediate bus, arbitrating other requests, and subsequently granting use of said intermediate bus back to said expansion bridge.

4. The passive release method of claim 1 wherein said host bridge is coupled to a CPU, and said CPU is prevented from posting data to said CPU posting buffer for a period beginning after the expansion bridge has won arbitration and ending when said expansion bridge has completed said transaction.

5. An arbitration signaling system, comprising:

an expansion bridge;

an intermediate bus;

a host bridge coupled to said expansion bridge and said intermediate bus, said host bridge including an arbiter, a CPU posting buffer, and a DRAM buffer wherein said arbiter arbitrates requests from said intermediate bus, said CPU posting buffer is emptied after said expansion bridge has won arbitration, and a grant signal is asserted to said expansion bridge to allow said expansion bridge use of said intermediate bus for a transaction;

said expansion bridge determining whether it can relinquish control of said intermediate bus before said transaction is complete and signaling a release signal to relinquish control of said intermediate bus before said transaction is complete;

said expansion bridge then immediately re-asserting said intermediate bus request to said arbiter; and said arbiter granting control of said expansion bridge to an agent coupled to said intermediate bus if said agent has higher priority than said expansion bridge, otherwise said arbiter returning control of said intermediate bridge to said expansion bridge, allowing said expansion bridge to continue with said transaction.

6. The arbitration signaling system of claim 5 wherein said DRAM buffer is emptied after said expansion bridge has won arbitration but before said grant signal is asserted to said expansion bridge to allow said expansion bridge use of said intermediate bus.

7. The arbitration signaling system of claim 5 wherein said arbiter further maintains said intermediate bus request by said expansion bridge to use said intermediate bus after said expansion bridge relinquishes control of said intermediate bus, arbitrates other requests, and subsequently grants use of said intermediate bus back to said expansion bridge.

8. The arbitration signaling system of claim 5 wherein said host bridge is coupled to a CPU, and said CPU is prevented from posting data to said CPU posting buffer for a period beginning after the expansion bridge has won arbitration and ending when said expansion bridge has completed said transaction.

\* \* \* \* \*